(12) United States Patent
Su et al.

(10) Patent No.: US 11,715,856 B2
(45) Date of Patent: Aug. 1, 2023

(54) BATTERY PACK

(71) Applicant: Contemporary Amperex Technology Co., Limited, Fujian (CN)

(72) Inventors: Lilei Su, Zhangwan Town (CN); Shaozhen Chen, Zhangwan Town (CN); Renwei Zheng, Zhangwan Town (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 517 days.

(21) Appl. No.: 16/540,359

(22) Filed: Aug. 14, 2019

(65) Prior Publication Data
US 2020/0212387 A1    Jul. 2, 2020

(30) Foreign Application Priority Data
Dec. 29, 2018   (CN) .......................... 201822275990.6

(51) Int. Cl.
*H01M 50/209*    (2021.01)
*H01M 50/262*    (2021.01)

(52) U.S. Cl.
CPC ....... *H01M 50/209* (2021.01); *H01M 50/262* (2021.01); *H01M 2220/20* (2013.01)

(58) Field of Classification Search
CPC ............. H01M 10/0413; H01M 50/20; H01M 50/244; H01M 50/262; H01M 50/209; H01M 2220/20; H01M 50/204; H01M 50/249; H01M 50/258
See application file for complete search history.

(56) References Cited

U.S. PATENT DOCUMENTS 9,819,001 B2    11/2017  Deng et al.
2007/0087266 A1*  4/2007  Bourke ............... H01M 50/502
                                                    429/159
(Continued)

FOREIGN PATENT DOCUMENTS

CN    101894985 A    11/2010
CN    206558568 U    10/2017
(Continued)

OTHER PUBLICATIONS

English translation of WO2013146561.*
(Continued)

*Primary Examiner* — Kiran Quraishi Akhtar
(74) *Attorney, Agent, or Firm* — Kilpatrick Townsend & Stockton LLP

(57) ABSTRACT

The present disclosure provides a battery pack including a casing and a battery module housed in the casing. The battery module can include a plurality of batteries arranged along a length direction and an end plate located at an end of the plurality of batteries in the length direction. The end plate can include a main body portion and a lug integrally formed with the main body portion, wherein the lug protrudes outwardly from the main body portion along the length direction and is fixedly connected to the casing. The design disclosed herein reduces the number of the components that are fixedly connected between the end plate and the casing, the number of steps in the operating procedure, and the production cost.

5 Claims, 5 Drawing Sheets

(56) References Cited

U.S. PATENT DOCUMENTS

| | | | | |
|---|---|---|---|---|
| 2012/0040237 A1* | 2/2012 | Hamada | ............... | H01M 50/20 |
| | | | | 429/159 |
| 2014/0295227 A1* | 10/2014 | Aoki | ................. | H01M 50/20 |
| | | | | 429/82 |
| 2014/0295235 A1 | 10/2014 | Jung | | |
| 2017/0084899 A1 | 3/2017 | Deng et al. | | |
| 2017/0214012 A1* | 7/2017 | Benedict | ............... | H01M 10/04 |
| 2018/0034014 A1* | 2/2018 | Ichikawa | ............ | H01M 50/543 |

FOREIGN PATENT DOCUMENTS

| | | | |
|---|---|---|---|
| CN | 206742287 U | 12/2017 | |
| CN | 208014775 U | 10/2018 | |
| CN | 207834396 | 12/2018 | |
| CN | 208248000 | 12/2018 | |
| CN | 208248506 | 12/2018 | |
| CN | 208249880 | 12/2018 | |
| CN | 208254283 | 12/2018 | |
| CN | 208254396 | 12/2018 | |
| CN | 208255328 | 12/2018 | |
| CN | 208256089 | 12/2018 | |
| CN | 208256758 | 12/2018 | |
| CN | 208256760 | 12/2018 | |
| CN | 208256761 | 12/2018 | |
| CN | 208256763 | 12/2018 | |
| CN | 208256764 | 12/2018 | |
| CN | 208256790 | 12/2018 | |
| CN | 208256805 | 12/2018 | |
| CN | 208256856 | 12/2018 | |
| CN | 208256868 | 12/2018 | |
| CN | 208256945 | 12/2018 | |
| CN | 208526762 | 12/2018 | |
| CN | 208797084 | 4/2019 | |
| CN | 209401684 U | 9/2019 | |
| WO | WO2013146561 * | 10/2013 | ............ H01M 10/50 |

OTHER PUBLICATIONS

EP Application No. 19206052.3, Extended European Search Report dated May 11, 2020, 14 pages.

International Application No. PCT/CN2019/124089 International Search Report of The International Searching Authority dated Mar. 9, 2020, 2 pages.

International Application No. PCT/CN2019/124089 Written Opinion of The International Searching Authority dated Mar. 9, 2020, 2 pages.

* cited by examiner

BATTERY PACK

PRIORITY

The present application claims priority to C.N. Application No. CN201822275990.6 filed on Dec. 29, 2018, which is incorporated by reference herein.

FIELD

The present disclosure relates to the field of batteries, in particular to a battery pack.

BACKGROUND

A battery pack generally includes a battery module and a casing. The battery module is housed in the casing. The battery module includes a plurality of batteries and end plates, and the end plates are fixed to the casing.

With regard to the way of fixing the end plates, the conventional design involves a battery module device and a battery module casing, in which the end plates and the battery module casing are fixedly connected to each other via a connecting beam independent from the end plates, which increases the number of components and the connecting procedures between the end plates and the battery module, thereby increasing the production cost.

In view of the deficiencies of the existing battery module design, one object of the present disclosure is to provide a battery pack that reduces the number of components that are fixedly connected between the end plates and the casing, reduces the steps in the operating procedure, thereby reducing the production costs.

SUMMARY

Disclosed herein is a battery pack, which can include a casing and a battery module housed in the casing. The battery module can include a plurality of batteries arranged along a length direction and an end plate located at an end of the plurality of batteries in the length direction. The end plate can include a main body portion and a lug integrally formed with the main body portion and the lug protruding outwardly from the main body portion along the length direction and fixedly connected to the casing.

In some embodiments, the casing can include a support beam, and the lug of the end plate can abut against the support beam from above and can be fixedly connected to the support beam.

In some embodiments, the position of the lug in a height direction can be located at a middle portion in the height direction of the main body portion of the end plate.

In some embodiments, the lug can be in a shape of a solid flat plate.

In some embodiments, the lug can be provided with a first mounting hole penetrating in the height direction, the support beam can be provided with a second mounting hole corresponding to the first mounting hole on the lug, the battery pack can include a fastener, wherein the fastener can pass through the first mounting hole and the second mounting hole to fix the lug and the support beam with each other.

In some embodiments, a highest point in the height direction of the fastener can be lower than an upper surface of the battery module, and a lowest point in the height direction of the fastener can be higher than a lower surface of the battery module.

In some embodiments, the second mounting hole can penetrate the support beam in the height direction, and the fastener can be a threaded connection element.

In some embodiments, the first mounting hole can be a long waist-shaped hole that along the length direction of the battery module.

In some embodiments, the first mounting hole can be configured to be one or a plurality of mounting holes in quantity, and the second mounting hole can include a corresponding amount of mounting holes.

In some embodiments, the casing can include a frame, and an end of the support beam can be connected to the frame.

Also disclosed herein is a method of reducing the number of the components in a battery module, which can include arranging a plurality of batteries along a length direction, placing an end plate at an end of the plurality of batteries in the length direction, and integrally forming a lug on a main body portion of an end plate. The lug can protrude outwardly from the main body portion along the length direction and form a fixed connection between the end plate and the casing.

Further disclosed herein is a method of manufacturing a battery pack, the method can include placing a battery module in a casing. The method can also include manufacturing a battery module, which can include arranging a plurality of batteries along a length direction, placing an end plate at an end of the plurality of batteries in the length direction, and integrally forming a lug on a main body portion of the end plate. The lug can protrude outwardly from the main body portion along the length direction and be fixedly connected to the casing.

BRIEF DESCRIPTION OF DRAWINGS

In order to facilitate a full understanding of the present disclosure, reference is now made to the accompanying drawings, in which like elements are referenced with like numerals. These drawings should not be construed as limiting the present disclosure, but are intended to be illustrative only. The drawings are not necessarily to scale, or inclusive of all elements of a system, emphasis instead generally being placed upon illustrating the concepts, structures, and techniques sought to be protected herein.

DESCRIPTION

Figure 1:
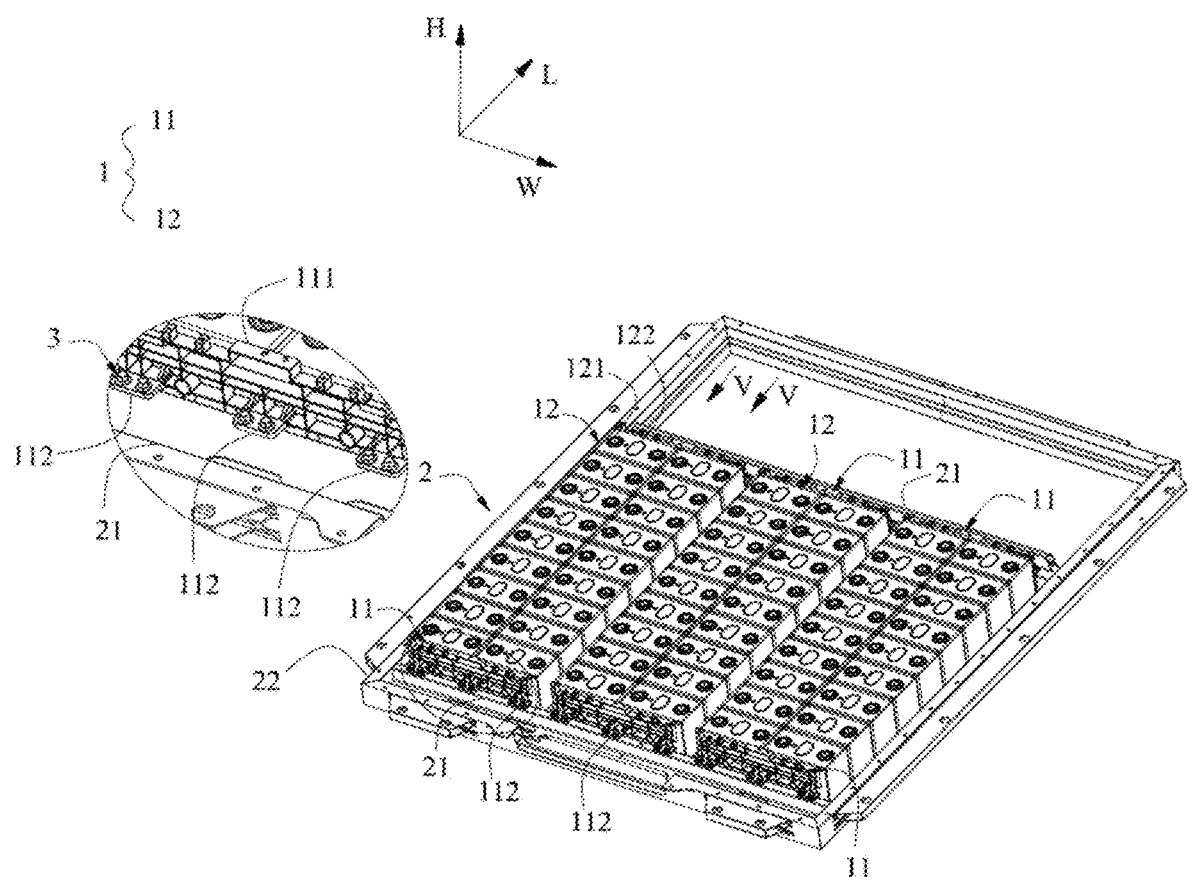
FIG. 1 is a perspective view of a battery pack, according to some embodiments of the present disclosure.

The battery pack and electric vehicle according to the present disclosure will be further described in detail with reference to the accompanying drawings.

The elements in the figures are described in the following:

1: battery module
11: end plate
111: main body portion 112 lug
12: battery
121: electrode
122: explosion-proof valve
2: casing
21: support beam
22: frame
3: fastener
H1: first mounting hole
H2: second mounting hole
V: battery row
L: length direction
W: width direction
H: height direction The accompanying drawings illustrate the embodiments of the present disclosure, and it is understood that the disclosed embodiments are only a few examples of the present disclosure. The present disclosure can be implemented in many different ways. Therefore, the specific details disclosed herein should not to be construed as limiting the present disclosure, rather, they are only intended to be a basis of the claims and as a basis of representation for teaching a person of ordinary skill in the art to implement the present disclosure in different ways.

The present disclosure has the following beneficial effects: on the basis that the main body portion and the lug are integrally formed, the number of the components that are fixedly connected between the end plate and the casing is reduced, the number of the steps in the operating procedure is reduced, and thus the cost is reduced as well.

Figure 2:
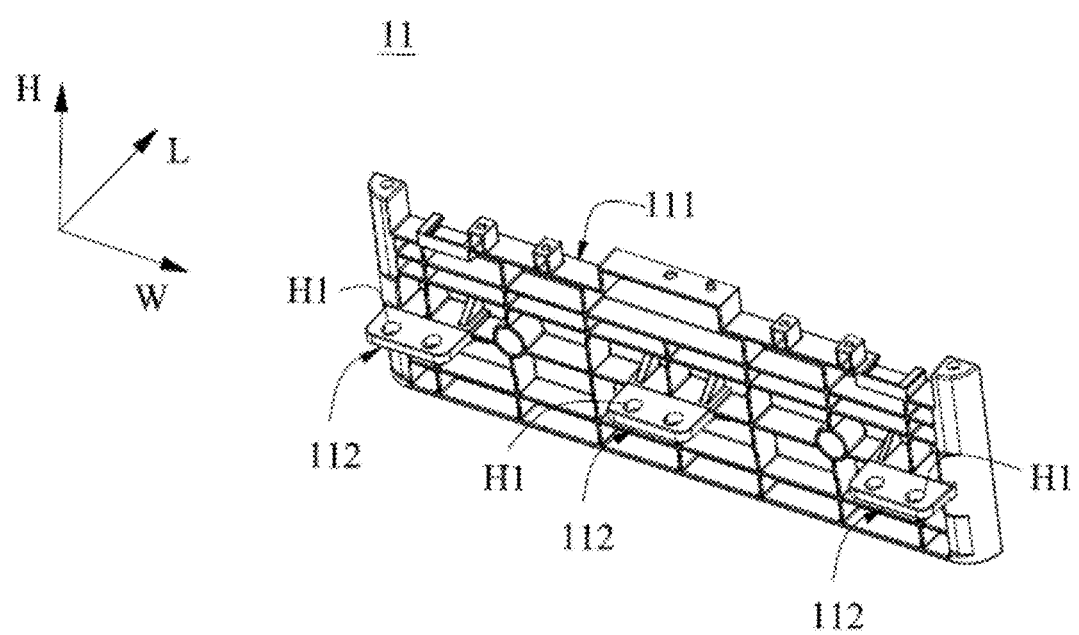
FIG. 2 is perspective view of an end plate of a battery module in the battery pack as shown in FIG. 1, according to some embodiments of the present disclosure.
Figure 3:
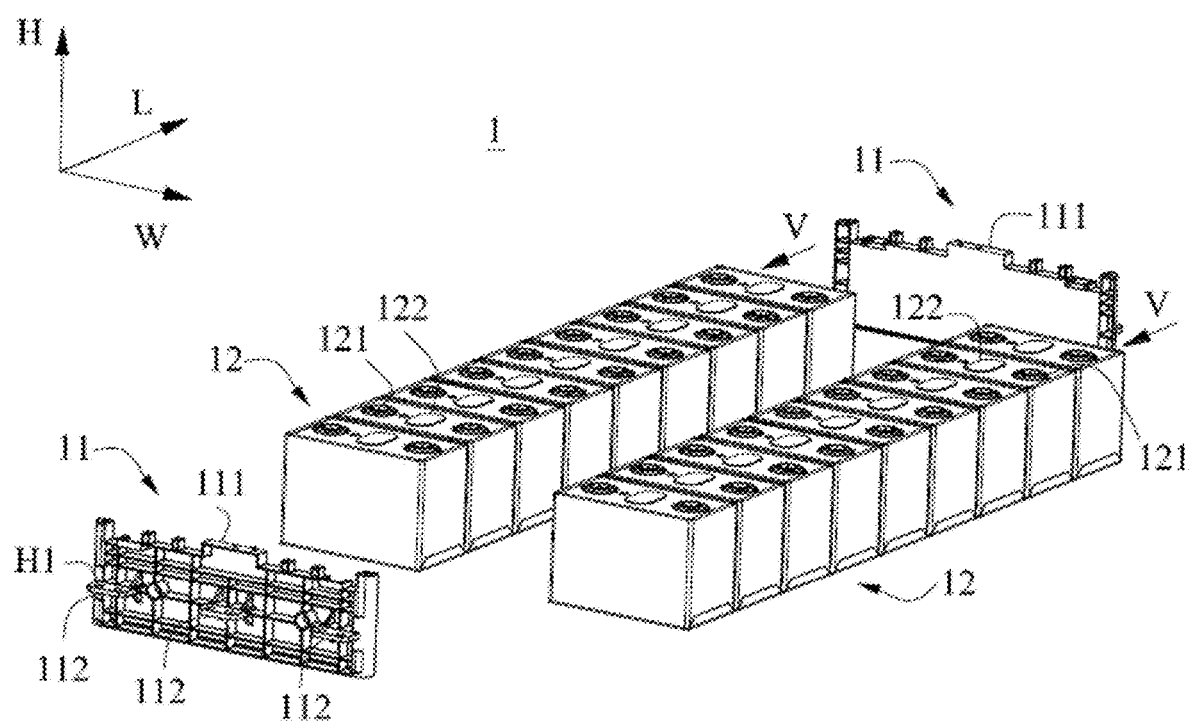
FIG. 3 is an exploded perspective view of the battery module in the battery pack as shown in FIG. 1, according to some embodiments of the present disclosure.
Figure 4:
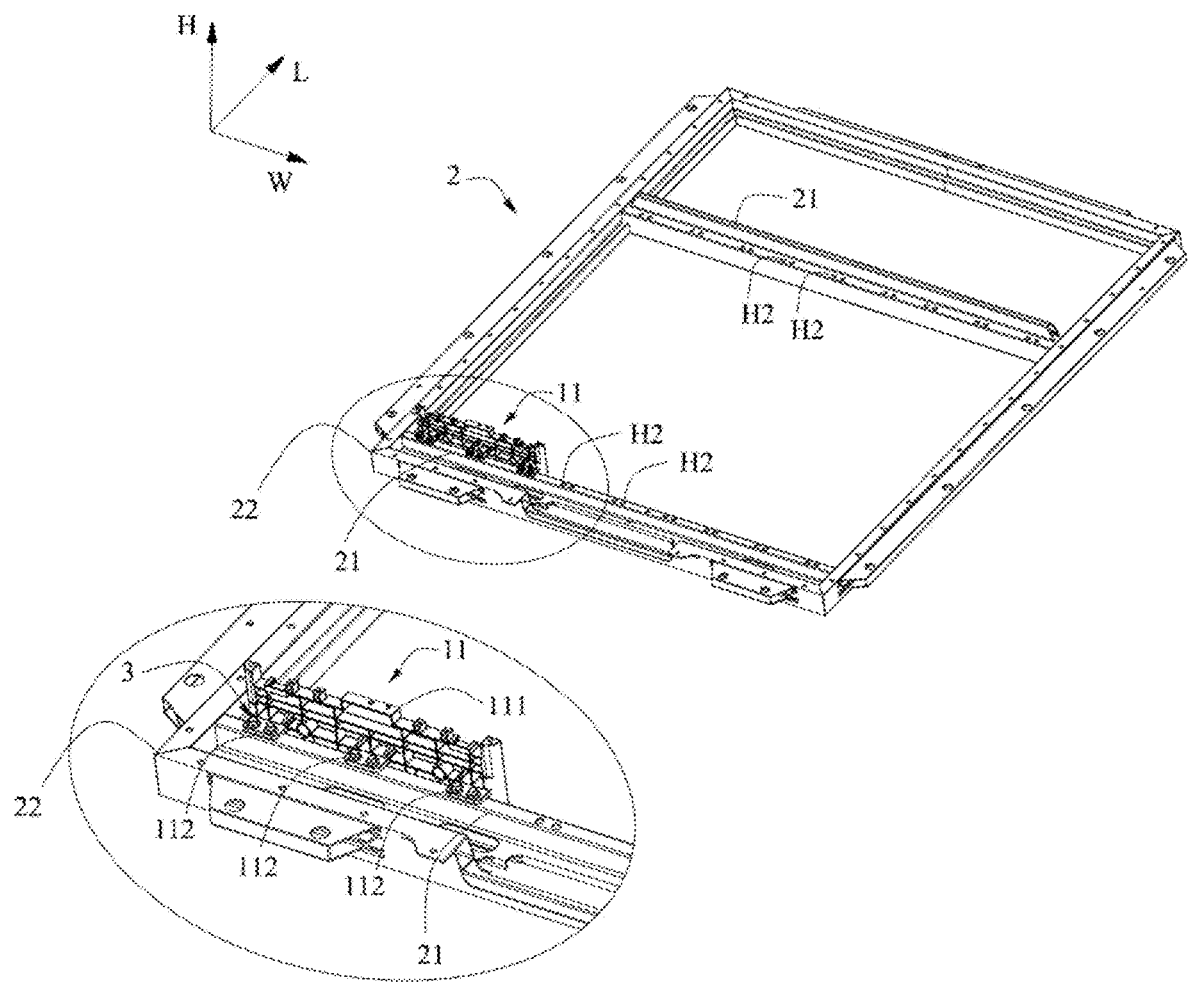
FIG. 4 is a perspective view of a battery pack with an end plate and a casing of a battery module, according to some embodiments of the present disclosure.
Figure 5:
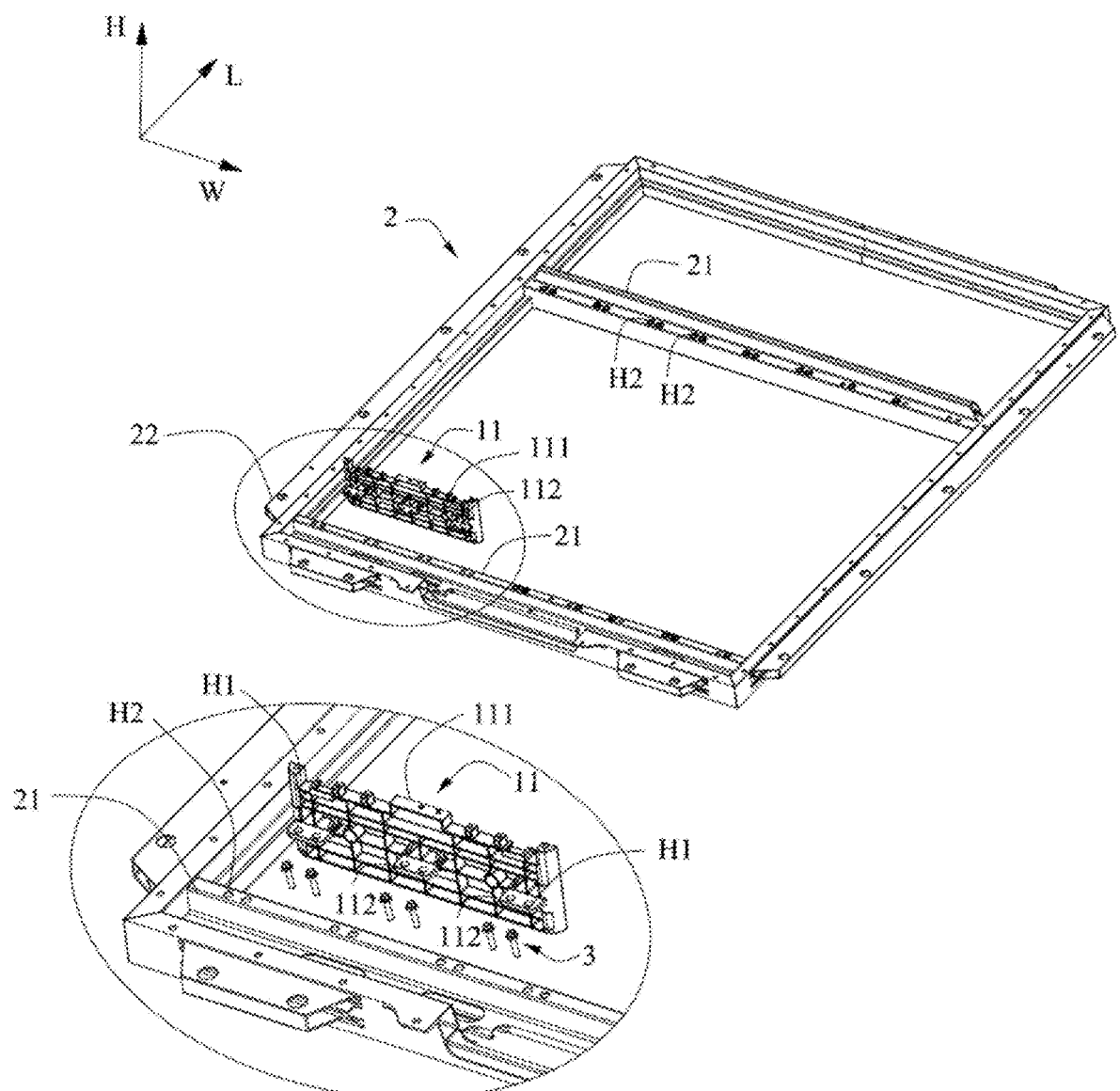
FIG. 5 is an exploded view of the battery pack as shown in FIG. 4, with an end plate and a casing of a battery module, according to some embodiments of the present disclosure.

FIG. 1 is a perspective view of a battery pack, according to some embodiments of the present disclosure. FIG. 2 is a perspective view of an end plate of a battery module in the battery pack as shown in FIG. 1, according to some embodiments of the present disclosure. FIG. 3 is an exploded perspective view of the battery module of the battery pack as shown in FIG. 1, according to some embodiments of the present disclosure. FIG. 4 is a perspective view of a battery pack, according to some embodiments of the present disclosure, showing an end plate and a casing of a battery module. FIG. 5 is an exploded view of the battery pack as shown in FIG. 4, according to some embodiments of the present disclosure, showing an end plate and a casing of a battery module.

A battery pack according to the present disclosure can include a battery module 1 and a casing 2, and battery module 1 can be housed in casing 2. Battery module 1 can include a plurality of batteries 12 and an end plate 11, the plurality of batteries 12 can be arranged along a length direction L, and end plate 11 can be located at an end of the plurality of batteries 12 in the length direction L. End plate 11 can include a main body portion 111 and a lug 112, wherein main body portion 111 and lug 112 can be integrally formed, and lug 112 can protrude outward from main body portion 111 along length direction L of battery module 1. Lug 112 can be fixedly connected to casing 2. In the present disclosure, the term "outward" can refer to a direction away from the plurality of batteries 12. On the basis of the integral formation of main body portion 111 and lug 112, the number of components that are fixedly connected between end plate 11 and casing 2 can be reduced, the number of the steps in the operating procedure can be reduced, and thus the cost can be reduced.

The type of battery can include, but is not limited to, lithium ion battery, aluminum ion battery, carbon battery, flow battery, lead-acid battery, glass battery, magnesium ion battery, metal air battery, molten salt battery, nickel cadmium battery, nickel hydrogen battery, nickel iron battery, nickel metal hydride battery, nickel zinc battery, organic radical battery, polymer-based battery, fuel cell, lithium sulfur battery, sodium ion battery, sodium sulfur battery, and zinc ion battery. In some embodiments, the battery is a lithium ion battery.

In some embodiments, battery 12 in battery module 1 can be a hard-shell battery (or referred to as a can-type battery) or a soft-pack battery (or a pouch-type battery). The hard-shell battery can include an electrode assembly, a casing, a top cover, a electrode 121, a liquid injection hole, and an explosion-proof valve 122. The inside of the casing can form a receiving cavity to receive the electrode assembly and an electrolyte. The electrode assembly can include a positive electrode sheet, a negative electrode sheet, and a separator that spaces the positive electrode sheet and the negative electrode sheet. The electrode assembly can be formed by means of winding a positive electrode sheet, a negative electrode sheet and a separator, or laminating a positive electrode sheet, a negative electrode sheet and a separator. The positive electrode sheet and the negative electrode sheet each can include a current collector and an active material layer disposed on the current collector. A soft pack battery can include a package pouch, for example, formed of an aluminum plastic film, an electrode assembly, which is similar to a hard shell battery in the structure and forming mode, and a lug. A portion of the lug can be enclosed within the package pouch and the other portion thereof can extend out from the package pouch. The lug can be formed directly from an electrode sheet or can be made from a separate conductive material and electrically connected to the current collector.

In reference to FIGS. 1 and 3, a plurality of batteries 12 can be arranged along a length direction L to form a battery row V. Battery module 1 can include one or more battery rows V arranged in a width direction W, and two ends of the one or more battery rows V in the length direction can be provided with the end plates 11. Battery module 1 shown in FIG. 3 includes two battery rows V. FIG. 1, on the other hand, shows three sets of battery rows and each set includes two battery rows V. End plate 11 of battery module 1 can be an aluminum plate or an aluminum alloy plate in order to reduce the weight of battery module 1.

In reference to FIGS. 1, 4, and 5, casing 2 can be a frame-shaped casing, casing 2 can include a support beam 21, and a lug 112 of the end plate 11 can abut against support beam 21 from above and can be fixedly connected to support beam 21. Casing 2 can further include a frame 22, an end of support beam 21 can be connected to frame 22. However, the type of casing 2 is not limited thereto, and casing 2 can also be in a disk shape, a box shape or the like. Lug 112 and a disk-shaped casing may be fixedly connected to each other via a flange (not shown) of the casing, while lug 112 and a box-shaped casing can be fixedly connected to each other via a side wall (not shown) of the casing. The force at the fixing position between end plate 11 of battery module 1 and support beam 21 of casing 2 can be transmitted to support beam 21 through lug 112. When lug 112 is fixedly connected with support beam 21, the surface contact area is large, and the force applied on battery module 1 at the fixing position is thus reduced. Moreover, support beam 21 can play a role for limiting and reinforcing so as to prevent battery module 1 from being displaced or deformed due to a force applied thereon.

In reference to FIGS. 1 to 5, lug 112 of end plate 11 can be in a shape of a solid flat plate, and lug 112 of the solid flat structure can provide sufficient strength to avoid breakage during vibration shocks.

Furthermore, the position of lug 112 of end plate 11 in height direction H can be located between the top and the bottom of main body portion 111 of end plate 11. In some embodiments, the position of lug 112 of end plate 11 in the height direction H can be located at a middle portion in the height direction H of main body portion 111 of end plate 11. The middle portion can refer to a position including the center in the height direction H of main body portion 111 of end plate 11 and a position in the vicinity thereof. In the conventional design of battery packs, the battery module in the battery pack is typically fixed by means of using a long bolt to penetrate in a height direction H from the top of a main body portion of an end plate of the battery module to the bottom of the main body portion of the end plate, which is then further fixed to a bottom plate (not shown) of the battery pack. However, when a car is in operation, in such a shaking environment, the battery module and the long bolt for fixing the battery module in the battery pack are usually subjected to a large force, which requires the bottom plate of the battery pack to be very strong. Moreover, the shaking movement may cause different types of failure. For example, the shaking movement of the battery pack may cause the long bolt of the fixed battery module to be subjected to a large stress, and the long bolt is deformed or even broken, thereby causing the entire battery pack to fail, or the local position of the bottom plate of the battery pack is subjected to a large pulling force, so that the bottom plate of the battery pack is deformed to cause cracks. When the battery module is subjected to a horizontal impact force, the support force from the casing of the battery pack to the battery module is at a lower position, such that the moving amplitude of the upper portion of the battery module is relatively large, and the resulting large deformation degree would cause the electrical connection piece (not shown) on the battery of the battery module 1 to fall off, causing the battery to fail. In the present disclosure, end plate 11 and the plurality of batteries 12 can be assembled together to form battery module 1 and the force applied at the position where lug 112 of end plate 11 and support beam 21 of casing 2 are fixedly connected to each other can be located close to the middle position in the height direction H of battery module 1, so as to reduce the moving amplitude of battery module 1 when an impact is applied thereon, thereby preventing the components on battery 12 from falling off due to a large moving amplitude. In this way, the present disclosure can avoid the above problems of the existing technology.

In reference to FIGS. 2 to 5, lug 112 can be provided with a first mounting hole H1 penetrating in the height direction H, support beam 21 can be provided with a second mounting hole H2 corresponding to first mounting hole H1 of lug 112, and the battery pack can further include a fastener 3, wherein fastener 3 can pass through first mounting hole H1 and second mounting hole H2 to fix lug 112 and support beam 21 with each other. In addition, the size of fastener 3 can be set as follows: after fastener 3 securely connects lug 112 and support beam 21 with each other, a highest point in the height direction H of fastener 3 can be lower than an upper surface of battery module 1, and a lowest point in the height direction H of fastener 3 can be higher than a lower surface of battery module 1. In this way, it is ensured that the fixation position of battery module 1 and support beam 21, that is from the highest point of the height direction H of fastener 3 to the lowest point of the height direction H of fastener 3, can be located within the height of battery module 1, such that the arm of force of any force applied on battery module 1 is reduced. Moreover, first mounting hole H1 can be a long waist-shaped hole along the length direction L of battery module 1. The length of battery module 1 along the length direction L can have a certain tolerance, and a waist shaped hole can absorb such a tolerance to ensure a proper installation size of battery module 1. As shown in FIG. 5, the second mounting hole H2 can penetrate support beam 21 in the height direction H, and fastener 3 can be a threaded connection element, for example, a bolt, which is secure and reliable. For the specific number of first mounting holes H1 on lugs 112, first mounting hole H1 can be configured to be one or a plurality of mounting holes in quantity, and second mounting hole H2 can have a corresponding amount of mounting holes. On the one hand, the configuration of the plurality of first mounting holes H1 and second mounting holes H2 corresponding to the plurality of first mounting holes H1 is able to strengthen the connection strength; on the other hand, the plurality of first mounting holes H1 and the plurality of second mounting hole H2 corresponding to first mounting hole H1 can be used for the fixed connection of battery module 1 to support beam 21 of casing 2 when battery module 1 is disposed in multiple layers. For example, in a two-layer battery module 1, there can be two first mounting holes H1 on lug 112 of the two-layer battery module 1, and the number of second mounting hole H2 on supporting beam 21 can also be set as two to correspond with first mounting holes H1. The lower layer of battery module 1 can be fixedly connected to one of second mounting holes H2 on support beam 21 through one of first mounting holes H1 of lug 112 of end plate 11 of the lower battery module 1, and the upper layer of the battery module 1 can be fixedly connected to the other second mounting hole H2 on support beam 21 through first mounting hole H1 on lug 112 of end plate 11 and the other first mounting hole H1 on lug 112 of end plate 11 of the lower battery module 1.

The above discussion describes various exemplary embodiments of the present disclosure, but the present disclosure is not limited to the specifically disclosed embodiments. Accordingly, the various features disclosed herein can be combined together to form a plurality of additional combinations that are not shown for the sake of clarity.

The above description only includes some embodiment of the present application, and is not intended to limit the present application. Various changes and modifications may be made to the present disclosure. Any modifications, equivalent substitutions, improvements, and the like made within the spirit and principle of the present disclosure fall within the scope of protection of the present application.

While the disclosure has been described in connection with certain embodiments, it is to be understood that the disclosure is not to be limited to the disclosed embodiments but, on the contrary, is intended to cover various modifications and equivalent arrangements included within the spirit and scope of the disclosure, which scope is to be accorded the broadest interpretation so as to encompass all such modifications and equivalent structures as is permitted under the law.

What is claimed is:
1. A battery pack, comprising:
a casing comprising a support beam; and
a battery module housed in the casing;
the battery module comprising:

a plurality of batteries arranged along a length direction; and an end plate located at an end of the plurality of batteries in the length direction;

the end plate comprising:

a main body portion; and a lug integrally formed with the main body portion, the lug protruding outwardly from the main body portion along the length direction, positioned in a height direction located at a middle portion of the main body portion of the end plate, abutting against the support beam from above the top surface of the support beam, and fixedly connected to the support beam of the casing;

wherein the lug is provided with a first mounting hole penetrating in the height direction, and the support beam is provided with a second mounting hole corresponding to the first mounting hole on the lug and penetrating the support beam through the entire height direction;

a fastener is provided to pass through the first mounting hole and the second mounting hole to fix the lug and the support beam to each other; and a highest point in the height direction of the fastener is lower than an upper surface of the battery module, and a lowest point in the height direction of the fastener is higher than a lower surface of the battery module.

2. The battery pack according to claim 1, wherein the lug is in a shape of a solid flat plate.

3. The battery pack according to claim 1, wherein the second mounting hole penetrates the support beam in the height direction, and the fastener is a threaded connection element.

4. The battery pack according to claim 1, wherein the first mounting hole is configured to be one or a plurality of mounting holes in quantity, and the second mounting hole has a corresponding amount of mounting holes.

5. The battery pack according to claim 1, wherein the casing comprises a frame, and an end of the support beam is connected to the frame.

* * * * *